United States Patent
Cudak et al.

(10) Patent No.: US 9,083,895 B2
(45) Date of Patent: Jul. 14, 2015

(54) EMBEDDED DOCUMENT DESTINATION ROUTING RESTRICTIONS

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 101 days.

(21) Appl. No.: 13/905,094

(22) Filed: May 29, 2013

(65) Prior Publication Data

US 2014/0355068 A1 Dec. 4, 2014

(51) Int. Cl.
  *G06K 9/00* (2006.01)
  *H04N 1/32* (2006.01)

(52) U.S. Cl.
  CPC ................... *H04N 1/32149* (2013.01)

(58) Field of Classification Search
  USPC ............ 382/100, 232; 713/54, 210, 252, 287; 704/176; 381/73.1; 348/460, 463
  See application file for complete search history.

(56) References Cited

U.S. PATENT DOCUMENTS

| | | | |
|---|---|---|---|
| 5,351,136 A | 9/1994 | Wu et al. | |
| 5,452,099 A | 9/1995 | Von Meister | |
| 5,490,217 A | 2/1996 | Wang et al. | |
| 5,590,196 A | 12/1996 | Moreau | |
| 5,659,164 A | 8/1997 | Schmid et al. | |
| 6,175,714 B1 | 1/2001 | Crean | |
| 8,010,801 B2 * | 8/2011 | Qi et al. | 713/189 |
| 8,261,060 B2 * | 9/2012 | Honjo | 713/153 |
| 8,601,590 B2 * | 12/2013 | Nakano et al. | 726/26 |
| 8,677,132 B1 * | 3/2014 | Liao et al. | 713/176 |
| 2004/0125396 A1 | 7/2004 | Burke | |
| 2007/0092105 A1 * | 4/2007 | Chiba et al. | 382/100 |
| 2007/0250715 A1 * | 10/2007 | Cai et al. | 713/176 |
| 2010/0259644 A1 * | 10/2010 | Lee et al. | 348/231.5 |

FOREIGN PATENT DOCUMENTS

JP 2009543519 12/2009

* cited by examiner

*Primary Examiner* — Anand Bhatnagar
(74) *Attorney, Agent, or Firm* — Steven M. Greenberg, Esq.; CRGO Law

(57) ABSTRACT

Embodiments of the present invention provide a method, system and computer program product for restricting transmission of a document. In an embodiment of the invention, a method for restricting transmission of a document is provided. The method includes loading an image of a document into memory of a computer, receiving a request to transmit the image to a specified destination, and in response to receiving the request, locating an embedded code within the document, extracting a restriction as to the transmission of the image of the document, applying the restriction, and transmitting the image of the document to the specified destination only if permitted by the restriction.

17 Claims, 2 Drawing Sheets

EMBEDDED DOCUMENT DESTINATION ROUTING RESTRICTIONS

BACKGROUND OF THE INVENTION

1. Field of the Invention

The present invention relates to document management and more particularly to restricting access to electronic documents for different end users.

2. Description of the Related Art

Traditionally, documents have been exchanged between parties by way of hand delivery, postal service, or facsimile. More recently, the public Internet has become a highly effective medium through which electronic documents have been exchanged, particularly as attachments to electronic mail. Still, in many occasions, the use of electronic mail cannot provide an adequate medium for document transfer. Specifically, where the original copy of a document is in a hard copy format, with handwritten or non-textual elements, a facsimile device can be the preferred tool of document exchange.

Facsimile devices ordinarily exchange facsimile data with other facsimile devices over the public switched telephone network (PSTN). Specifically, as in the case of an ordinary telephone call, the calling facsimile device can establish a communicative link over the PSTN to a receiving facsimile device. Each of the devices can negotiate suitable data exchange protocols and the transfer of facsimile data can commence. Upon completion of the exchange, the received facsimile data can be transposed to hard copy form and the call can terminate. Of note, several technologies have been developed with which facsimile data can be exchanged between facsimile devices not over the PSTN, but over the public Internet. Referred to in the art as "IP faxing", facsimile data can be packetized and forwarded across the Internet to a network node local to the facsimile recipient.

Whether by facsimile, e-mail attachment or other electronic mode of data transfer, distributing documents in many circumstances calls for the restriction of access to the document by particular individuals. In this regard, advanced forms of digital rights management (DRM) technologies provide for restrictions in accessing and re-distributing not only the content of an e-mail message or attachments thereto, but also individual files—especially word processing documents, spreadsheets and media files. These advanced DRM technologies, however, are reliant upon the electronic form of the sensitive content being restricted. Once the content has been reduced to print form, nothing restricts the subsequent scanning and transmitting or facsimile transmitting of an image of the sensitive content.

BRIEF SUMMARY OF THE INVENTION

Embodiments of the present invention address deficiencies of the art in respect to digital rights management and provide a novel and non-obvious method, system and computer program product for restricting transmission of a document. In an embodiment of the invention, a method for restricting transmission of a document is provided. The method includes loading an image of a document into memory of a computer, receiving a request to transmit the image to a specified destination, and in response to receiving the request, locating an embedded code within the document, extracting a restriction as to the transmission of the image of the document, applying the restriction, and transmitting the image of the document to the specified destination only if permitted by the restriction.

In one aspect of the embodiment, the embedded code is embedded within text of the image of the document. In another aspect of the embodiment, the restriction specifies a destination either permitted or prohibited to receive a transmission of the image. In yet another aspect of the embodiment, the restriction specifies a time of day or date during which the image is either permitted or prohibited to be transmitted. In even yet another aspect of the embodiment, the method additionally includes updating the embedded code with the specified destination. Finally, in yet a further aspect of the embodiment, the method includes detecting a checksum code in the image of the document, computing a checksum of the image of the document, comparing the checksum code to the computed checksum, and triggering an error condition in response to a failure of the checksum code and the computed checksum to match.

In another embodiment of the invention, a document transmission data processing system is provided. The system includes a host computing platform that includes at least one processor, memory, fixed storage and a display. The system also includes a document image processor executing in the memory and configured to load into memory an image of a document and transmit the image to a specified destination. Finally, the system includes a document restrictions module coupled to the document image processor. The module includes program code enabled to respond to a request in the document image processor to transmit the image of the document by locating an embedded code within the document, extracting a restriction as to the transmission of the image of the document, applying the restriction, and directing the document image processor to transmit the image of the document to the specified destination only if permitted by the restriction. In one aspect of the embodiment, the computer is included as part of a facsimile device and the image is a facsimile of a document.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for restricting transmission of an image of a document. In accordance with an embodiment of the invention, a code can be generated to indicate restrictions upon the transmission of an image of a document, such as a list of approved or disapproved destinations or geographic locations, or times during which the image of the document is permitted to be transmitted or blocked from transmission. The code subsequently can be embedded in an image of the document. Thereafter, upon transmission of the image of the document, the embedded code can be detected and processed to determine the restrictions and the transmission of the image of the document can be completed only as permitted by the restrictions. Of note, the embedded code can be modified in response to the permission of transmission of the image of the document to a particular destination, in order to indicate the destination to which the image of the document is transmitted. As such in addition to specifying restrictions upon the transmission of the image of the document, the embedded code also can provide an audit trail of recipients of the image of the document.

Figure 1:
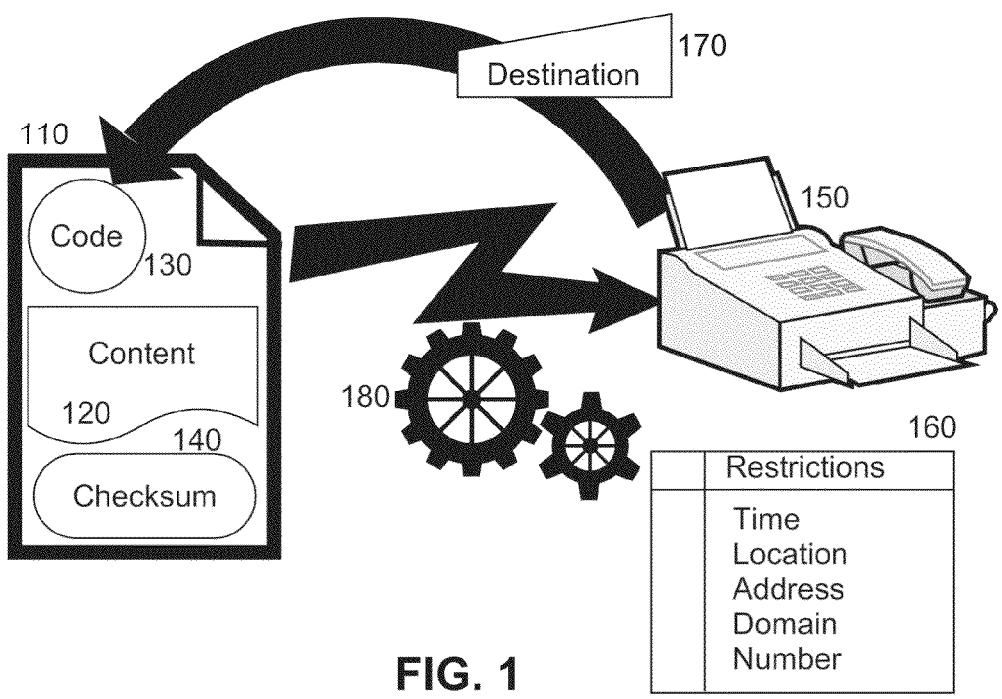
FIG. 1 is a pictorial illustration of a process for restricting transmission of a document.

In further, illustration, FIG. 1 pictorially shows a process for restricting transmission of a document. As shown in FIG. 1, a document 110 can include both content 120 includes as part of the document 110 such as text or imagery, as well as an embedded code 130. The embedded code 130 can include an encoded set of one or more restrictions upon the transmission of an image of the document 110. The embedded code 130 further can be a standalone image placed within the document 110 and visibly apparent to the naked human eye. Alternatively, the embedded code can be masked within text or imagery of the content 120 so that the embedded code 130 is not visibly apparent to the naked human eye.

Of note, the restrictions of the embedded code 130 can include a list of one or more telephone numbers, geographic locations, domains, e-mail addresses or IP addresses to which an image of the document 110 is not permitted to be transmitted. Additionally, the embedded code 130 can include an encoded list of one or more telephone numbers, geographic locations, domains, e-mail addresses or IP addresses to which an image of the document 110 is only permitted to be transmitted. Yet further, the embedded code 130 can include an encoded list of one or more times or dates when an image of the document 110 is permitted or not permitted to be transmitted. Optionally, a checksum 140 can be included as part of the document 110. The checksum 140 can provide a hash value for the content 120 and embedded code 130 of the document 110 to ensure that the embedded code 130 has not been modified.

In operation, document transmission restriction logic 180 operating in concert with a document transmission system 150 such as a facsimile device or e-mail client or server, can extract the embedded code 130 from the document 110 in response to a request to transmit an image of the document 110 to a destination 170. The logic 180 additionally can determine the restrictions 160 of the embedded code and the logic 180 can determine whether or not it is permissible to complete transmission of the image of the document 110 to the destination 170. Optionally, to the extent that delivery of the image of the document 110 is permitted according to the restrictions 160, the logic 180 can modify the embedded code 130 to include a reference to the destination so as to provide an audit trail of destinations within the embedded code of destinations receiving images of the document 110.

Figure 2:
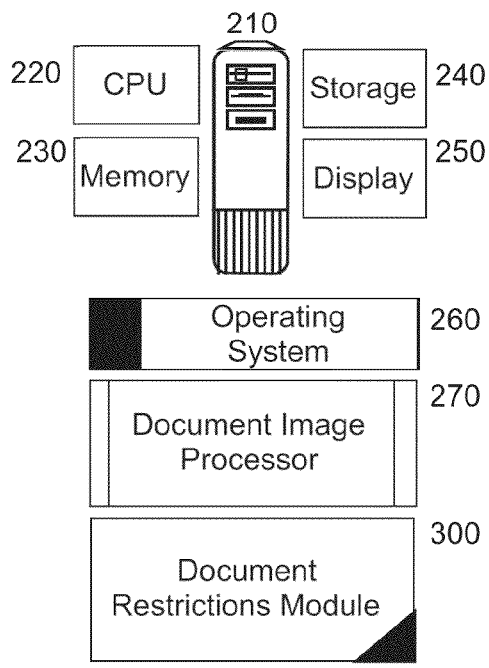
FIG. 2 is a schematic illustration of a document transmission data processing system configured for restricting transmission of a document; and, FIG. 3 is a flow chart illustrating a process for restricting transmission of a document.

The process described in connection with FIG. 1 can be implemented as part of a document transmission data processing system including a facsimile device, e-mail transmission client or server, or computerized facsimile computer program. In further illustration, FIG. 2 schematically shows a document transmission data processing system configured for restricting transmission of a document. The system can include a host computing platform 210 including at least one processor 220, memory 230, fixed storage 240 and a display 250. The host computing platform 210 can provide support for an operating system 260. The operating system 260 in turn can host the execution of a document image processor 270.

The document image processor 270 can be configured to transmit an image of a document to a specified destination. For example, the document image processor 270 can be a computer program configured to load into memory an image of a document and transmit the image to a destination document image processor, for example by way of a telephonic communications link as in the case of conventional facsimile transmission, or by way of a data communications link as in the case of e-mail transmission with attachment processing. Of note, a document restrictions module 300 can be coupled to the document image processor 270.

The document restrictions module 300 can include program code that when executed in the memory 230 by the processor 220 is enabled to extract an embedded code from an image of a document submitted to the document image processor 270 for transmission to a particular destination. The program code further can be enabled to determine the restrictions of the embedded code and whether or not it is permissible to complete transmission of the image of the document to the destination. Optionally, the program code of the module 300 yet further can be enabled to modify the embedded code to include a reference to the destination so as to provide an audit trail of destinations within the embedded code of destinations receiving images of the document.

Figure 3:
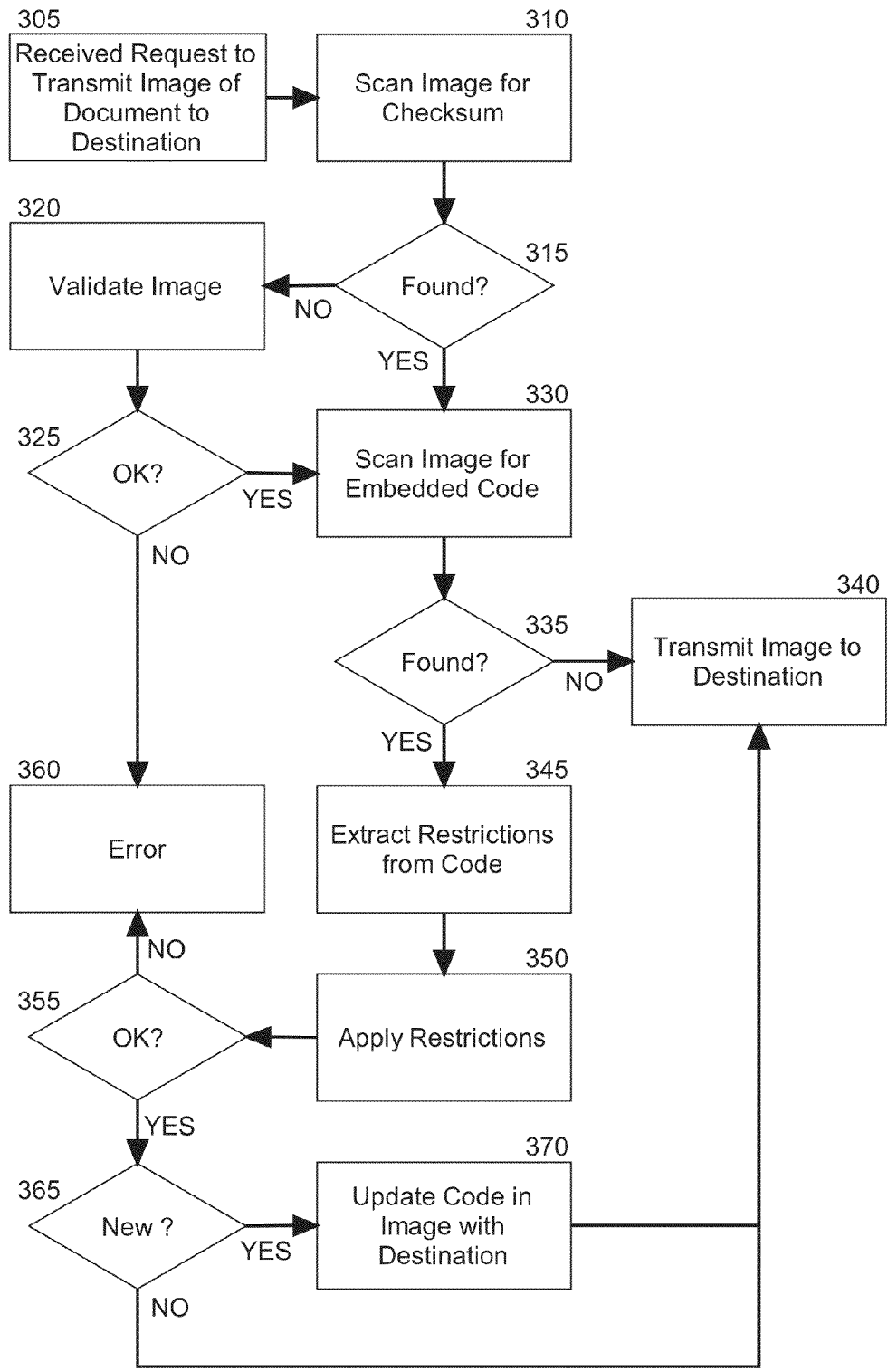

In even yet further illustration of the operation of the document restrictions module 300, FIG. 3 is a flow chart illustrating a process for restricting transmission of a document. Beginning in block 305, a request can be received to transmit an image of a document to a specified destination. In block 310, the image can be processed to identify whether or not a checksum code is present within the image. In decision block 315, if a checksum code is determined to be present within the image, in block 320 the image can be validated against the checksum by computing a checksum for the image and comparing the computed checksum to that of the checksum code. In decision block 325, if the checksums do not match, in block 360 an error condition can be triggered. Otherwise, the process can continue through block 330.

In block 330, the image can be processed to determine whether or not an embedded code is present in the image. In decision block 335, if no embedded code is present in the image, in block 340 the image can be transmitted to the specified destination. Otherwise, in block 345 one or more restrictions stored in the embedded code can be extracted from the embedded code and in block 350, the restrictions can be applied to the request to transmit the image of the document. For example, it can be determined whether or not the specified destination is a destination listed as a prohibited destination, or whether or not the specified destination is a destination listed as a permitted destination. As another example, it can be determined whether or not the location or domain of the destination is permitted or prohibited according to the restrictions. As yet a further example, it can be determined whether or not the time of day or the date during which the image is requested to be transmitted is a permitted time of day or data according to the restrictions.

In decision block 355, if the restrictions once applied do not permit the transmission of the image of the document to the destination, in block 360 an error condition can be triggered. Otherwise, in decision block 365 it can be determined whether or not the specified destination is a new destination not yet in receipt of an image of the document. If so, in block

370 the embedded code can be updated to include the specified destination in an audit trail of destinations receiving an image of the document (and the checksum can be updated as required). Finally, in block 340 the image can be transmitted to the specified destination.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for restricting transmission of a document, the method comprising:
    loading an image of a document into memory of a computer;
    receiving a request to transmit the image to a specified destination; and,
    in response to receiving the request, locating an embedded code within the document, extracting a restriction as to the transmission of the image of the document, the restriction specifying a time of day or date during which the image is either permitted or prohibited to be transmitted, applying the restriction, and transmitting the image of the document to the specified destination only if permitted by the restriction.

2. The method of claim 1, wherein the embedded code is embedded within text of the image of the document.

3. The method of claim 1, wherein the restriction specifies a destination either permitted or prohibited to receive a transmission of the image.

4. The method of claim 1, further comprising updating the embedded code with the specified destination.

5. The method of claim 1, further comprising:
    detecting a checksum code in the image of the document;
    computing a checksum of the image of the document;
    comparing the checksum code to the computed checksum; and,
    triggering an error condition in response to a failure of the checksum code and the computed checksum to match.

6. A document transmission data processing system comprising:
    a host computing platform comprising at least one processor, memory, fixed storage and a display;
    a document image processor executing in the memory and configured to load into memory an image of a document and transmit the image to a specified destination; and,
    a document restrictions module coupled to the document image processor, the module comprising program code enabled to respond to a request in the document image processor to transmit the image of the document by locating an embedded code within the document, extracting a restriction as to the transmission of the image of the document, the restriction specifying a time of day or date during which the image is either permitted or prohibited to be transmitted, applying the restriction, and directing the document image processor to transmit the image of the document to the specified destination only if permitted by the restriction.

7. The system of claim 6, wherein the computer is included as part of a facsimile device.

8. The system of claim 6, wherein the image is a facsimile of a document.

9. The system of claim 6, wherein the embedded code is embedded within text of the image of the document.

10. The system of claim 6, wherein the restriction specifies a destination either permitted or prohibited to receive a transmission of the image.

11. The system of claim 6, wherein the program code is further enabled to update the embedded code with the specified destination.

12. The system of claim 6, wherein the program code is further enabled to:
    detect a checksum code in the image of the document;
    compute a checksum of the image of the document;
    compare the checksum code to the computed checksum; and,
    trigger an error condition in response to a failure of the checksum code and the computed checksum to match.

13. A computer program product for restricting transmission of a document, the computer program product comprising:
    a computer readable storage memory device having computer readable program code embodied therewith, the computer readable program code comprising:
    computer readable program code for loading an image of a document into memory of a computer;
    computer readable program code for receiving a request to transmit the image to a specified destination; and,
    computer readable program code for responding to receiving the request by locating an embedded code within the document, extracting a restriction as to the transmission of the image of the document, the restriction specifying a time of day or date during which the image is either permitted or prohibited to be transmitted, applying the restriction, and transmitting the image of the document to the specified destination only if permitted by the restriction.

14. The computer program product of claim 13, wherein the embedded code is embedded within text of the image of the document.

15. The computer program product of claim 13, wherein the restriction specifies a destination either permitted or prohibited to receive a transmission of the image.

16. The computer program product of claim 13, further comprising computer readable program code for updating the embedded code with the specified destination.

17. The computer program product of claim 13, further comprising:
    computer readable program code for detecting a checksum code in the image of the document;
    computer readable program code for computing a checksum of the image of the document;
    computer readable program code for comparing the checksum code to the computed checksum; and,
    computer readable program code for triggering an error condition in response to a failure of the checksum code and the computed checksum to match.

* * * * *